(12) United States Patent
Jiang et al.

(10) Patent No.: US 12,444,737 B2
(45) Date of Patent: *Oct. 14, 2025

(54) ANODE MATERIAL, ELECTROCHEMICAL DEVICE AND ELECTRONIC DEVICE COMPRISING THE SAME

(71) Applicant: Ningde Amperex Technology Limited, Ningde (CN)

(72) Inventors: Daoyi Jiang, Ningde (CN); Zhihuan Chen, Ningde (CN); Hang Cui, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 758 days.

This patent is subject to a terminal disclaimer.

(21) Appl. No.: 17/514,461

(22) Filed: Oct. 29, 2021

(65) Prior Publication Data

US 2022/0052328 A1 Feb. 17, 2022

Related U.S. Application Data

(63) Continuation of application No. PCT/CN2019/118581, filed on Nov. 14, 2019.

(51) Int. Cl.
*H01M 4/134* (2010.01)
*C01B 33/113* (2006.01)
(Continued)

(52) U.S. Cl.
CPC ........... *H01M 4/483* (2013.01); *C01B 33/113* (2013.01); *C01F 7/304* (2013.01); *C01G 23/04* (2013.01);
(Continued)

(58) Field of Classification Search
CPC ...... H01M 4/483; H01M 4/366; H01M 4/625; H01M 10/0525; H01M 2004/021;
(Continued)

(56) References Cited

U.S. PATENT DOCUMENTS

2013/0052536 A1 2/2013 Belharouak
2015/0243969 A1 8/2015 Ku et al.
(Continued)

FOREIGN PATENT DOCUMENTS

CN 101145621 A 3/2008
CN 102054983 A 5/2011
(Continued)

OTHER PUBLICATIONS

R.D. Boehm et al., 1.107 ăCarbon and Diamond, Comprehensive Biomaterials, vol. 1, 2011, pp. 109-126, retrieved from <https://www.sciencedirect.com/science/article/pii/B9780080552941000180> on Aug. 15, 2024. (Year: 2011).*
(Continued)

*Primary Examiner* — Cynthia K Walls
(74) *Attorney, Agent, or Firm* — Maier & Maier, PLLC (57) ABSTRACT

An anode material includes a silicon composite substrate. In the X-ray diffraction pattern of the anode material, the highest intensity at 2θ within the range of 28.0° to 29.0° is $I_2$, and the highest intensity at 2θ within the range of 20.5° to 21.5° is $I_1$, wherein $0<I_2/I_1\leq1$. The anode material has good cycle performance, and the battery prepared with the anode material has better rate performance and a lower swelling rate.

18 Claims, 4 Drawing Sheets

(51) Int. Cl.
*C01F 7/304* (2022.01)
*C01G 23/04* (2006.01)
*H01M 4/36* (2006.01)
*H01M 4/48* (2010.01)
*H01M 4/62* (2006.01)
*H01M 10/0525* (2010.01)
*H01M 4/02* (2006.01)

(52) U.S. Cl.
CPC .......... *H01M 4/366* (2013.01); *H01M 4/625* (2013.01); *H01M 10/0525* (2013.01); *C01P 2002/72* (2013.01); *C01P 2004/51* (2013.01); *C01P 2004/64* (2013.01); *C01P 2006/40* (2013.01); *H01M 2004/021* (2013.01); *H01M 2004/027* (2013.01)

(58) Field of Classification Search
CPC .......... H01M 2004/027; H01M 4/386; H01M 4/622; H01M 4/623; C01B 33/113; C01F 7/304; C01G 23/04; C01P 2002/72; C01P 2004/51; C01P 2004/64; C01P 2006/40; C01P 2004/61; C01P 2006/12; C09C 1/3054; Y02E 60/10
See application file for complete search history.

(56) References Cited

U.S. PATENT DOCUMENTS

2015/0380735 A1 12/2015 Tuduki et al.
2018/0175377 A1* 6/2018 Hirose .................. H01M 4/386

FOREIGN PATENT DOCUMENTS

| CN | 102122708 A | 7/2011 |
|---|---|---|
| CN | 102738440 A | 10/2012 |
| CN | 103229336 A | 7/2013 |
| CN | 103247791 A | 8/2013 |
| CN | 104966822 A | 10/2015 |
| CN | 105229828 A | 1/2016 |
| CN | 105655564 A | 6/2016 |
| CN | 106797025 A | 5/2017 |
| CN | 106898755 A | 6/2017 |
| CN | 106953088 A | 7/2017 |
| CN | 107710466 A | 2/2018 |
| CN | 109461880 A | 3/2019 |
| CN | 109638254 A | 4/2019 |
| CN | 109817949 A | 5/2019 |
| CN | 109841823 A | 6/2019 |
| CN | 110034284 A | 7/2019 |
| CN | 110380033 A | 10/2019 |
| CN | 110444750 A | 11/2019 |
| EP | 2 509 139 A1 | 4/2012 |
| JP | 2008098151 A | 4/2008 |
| WO | 2015/015548 A1 | 2/2015 |
| WO | 2019173581 A1 | 9/2019 |

OTHER PUBLICATIONS

Machine translation of CN 102122708, retrieved from on Aug. 14, 2024.*
Doh, Chil-Hoon, "A new SiO/C anode composition for lithium-ion battery", Journal of Power Sources, 179, 2008, pp. 1-18.
ISR for International Application PCT/CN2019/118581 mailed Aug. 6, 2020.
First Office Action for Counterpart Application No. 201911115339.5 mailed Jul. 31, 2020.
Second Office Action for Counterpart Application No. 201911115339.5 mailed Sep. 30, 2020.
Notice of Grant for Counterpart Application 201911115339-5 mailed Dec. 3, 2020.
Extended European Search Report, dated Oct. 21, 2022, corresponding to EP Application No. 19946253.2.
Japanese Office Action (Notice of Reasons for Refusal), dated Aug. 2, 2022, corresponding to JP Application No. 2021-536239.
Japanese Office Action (Notice of Reasons for Refusal), dated Feb. 21, 2023, corresponding to JP Application No. 2021-536239.
Japanese Office Action (Decision to Grant a Patent), dated Aug. 29, 2023, corresponding to JP Application No. 2021-536239.
International Search Report, dated Jul. 30, 2020, corresponding to CN Application No. PCT/CN2019/118584.

* cited by examiner

ANODE MATERIAL, ELECTROCHEMICAL DEVICE AND ELECTRONIC DEVICE COMPRISING THE SAME

CROSS-REFERENCE TO THE RELATED APPLICATIONS

This application is a continuation of International Patent Application No. PCT/CN2019/118581 filed on Nov. 14, 2019, the disclosure of which is hereby incorporated by reference in its entirety.

BACKGROUND

1. Technical Field

The present application relates to the field of energy storage, and particularly to an anode material, an electrochemical device and an electronic device comprising the anode material, particularly lithium ion batteries.

2. Description of the Related Art

With the popularization of consumer electronic products, such as notebook computers, mobile phones, tablet computers, mobile power supplies, and unmanned aerial vehicles, the requirements for electrochemical devices used therein are becoming stricter. For example, a battery is not only required to be light in weight, but is also required to have high capacity and a relatively long service life. Lithium ion batteries have occupied a leading position in the market due to their outstanding advantages, such as high energy density, excellent safety, no memory effect and long service life.

SUMMARY

Embodiments of the present application provide an anode material and a method for preparing the anode material, to solve at least one of the problems existing in related art to some extent. The embodiments of the present application also provide an anode using the anode material, an electrochemical device, and an electronic device.

In one embodiment, the present application provides an anode material, which comprises a silicon composite substrate, wherein in the X-ray diffraction pattern of the anode material, the highest intensity at 2θ within the range of about 28.0° to 29.0° is $I_2$, and the highest intensity at 2θ within the range of about 20.5° to 21.5° is $I_1$, wherein about $0 < I_2/I_1 \leq$ about 1.

In another embodiment, the present application provides a method for preparing an anode material, which comprises:
  mixing silicon dioxide and metal silicon powder at a molar ratio of about 1:5 to 5:1 to obtain a mixed material;
  heating the mixed material under about $10^{-4}$ to $10^{-1}$ kPa, at a temperature range of about 1100 to 1550° C. for about 0.5 to 24 hr to obtain a gas;
  condensing the gas obtained to obtain a solid;
  crushing and screening the solid; and
  heat-treating the solid at a temperature range of about 400° C. to 1200° C. for 1 to 24 hr, and cooling the heat-treated solid to obtain an anode active material.

In another embodiment, the present application provides an anode, which comprises an anode material according to an embodiment of the present application.

In another embodiment, the present application provides an electrochemical device, which comprises an anode according to an embodiment of the present application.

In another embodiment, the present application provides an electronic device, which comprises an electrochemical device according to an embodiment of the present application.

The present application controls the disproportionation degree of SiO starting from a precursor of SiO so that the disproportionation degree of SiO is small. The obtained anode active material has good cycle performance, and the lithium ion battery prepared with the anode active material has a good rate performance and lower swelling rate.

Additional aspects and advantages of the embodiments of the present application will be described or shown in the following description or interpreted by implementing the embodiments of the present application.

BRIEF DESCRIPTION OF THE DRAWINGS

Drawings necessary to describe the embodiments of the present application or the prior art will be briefly illustrated so as to facilitate the description of the embodiments of the present application. Obviously, the accompanying drawings show only some of the embodiments of the present application. For those skilled in the art, the drawings of other embodiments can still be obtained according to the structures illustrated in the drawings without any creative effort.

DETAILED DESCRIPTION

The embodiments of the present application will be described in detail below. The embodiments of the present application should not be interpreted as limitations to the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In the present application, Dv50 is the particle size corresponding to a cumulative volume percentage of the anode active material that is 50%, and the unit is μm.

In the present application, Dn10 is the particle size corresponding to a cumulative number percentage of the anode active material reaching 10%, and the unit is μm.

In the present application, the silicon composite comprises elemental silicon, a silicon compound, a mixture of elemental silicon and a silicon compound, or a mixture of various silicides.

In addition, amounts, ratios, and other values are sometimes presented in a range format in this application. It is to be understood that such a range format is provided for the sake of convenience and simplicity, and should be understood flexibly to include not only the numerical values that are explicitly defined in the range, but also all the individual values or sub-ranges that are included in the range, as if each value and sub-range are explicitly specified.

In the detailed description and claims, a list of items connected by the term "one of" or the like means any one of the listed items. For example, if items A and B are listed, the phrase "one of A and B" means only A or only B. In another example, if items A, B, and C are listed, then the phrase "one of A, B, and C" means only A; only B; or only C. Item A may include a single or multiple elements. Item B may include a single or multiple elements. Item C may include a single or multiple elements.

In the detailed description and claims, a list of items connected by the term "at least one of" or the like means any combination of the listed items. For example, if items A and B are listed, the phrase "at least one of A and B" means only A; only B; or A and B. In another example, if items A, B, and C are listed, then the phrase "at least one of A, B, and C" means only A; only B; only C; A and B (excluding C); A and C (excluding B); B and C (excluding A); or A, B, and C. Item A may include a single or multiple elements. Item B may include a single or multiple elements. Item C may include a single or multiple elements.

I. Anode Material

An embodiment of the present application provides an anode material, which comprises a silicon composite substrate. In the X-ray diffraction pattern of the anode material, the highest intensity at 2θ within the range of about 28.0° to 29.0° is $I_2$, and the highest intensity at 2θ within the range of about 20.5° to 21.5° is $I_1$, wherein about $0<I_2/I_1\leq$about 1.

In some embodiments, in the X-ray diffraction pattern of the anode material, the highest intensity at 2θ of about 28.4° is $I_2$, and the highest intensity at 2θ of about 21.0° is $I_1$, wherein about $0<I_2/I_1\leq$about 1.

In some embodiments, the silicon composite substrate comprises a silicon-containing substance. The silicon-containing substance in the silicon composite substrate can form a composite with one or more of other substances than the silicon-containing substance in the anode material. In some embodiments, the silicon composite substrate comprises particles that can intercalate and deintercalate lithium ions.

In some embodiments, the Dv50 of the silicon composite substrate is from about 2.5 to 10 μm. In some embodiments, the Dv50 of the silicon composite substrate is from about 4 to 8 μm. In some embodiments, the Dv50 of the silicon composite substrate is from about 4.5 to 6 μm.

In some embodiments, the silicon composite substrate has a particle size distribution meeting: about $0.3\leq$Dn10/Dv50$\leq$about 0.6. In some embodiments, the silicon composite substrate has a particle size distribution meeting: about $0.4\leq$Dn10/Dv50$\leq$about 0.5.

In some embodiments, the silicon composite substrate comprises $SiO_x$, wherein about $0.6\leq x\leq$about 1.5.

In some embodiments, the silicon composite substrate comprises nano-Si crystalline grains, SiO, $SiO_2$, or any combination thereof.

In some embodiments, the particle size of the nano-Si crystalline grains is less than about 100 nm. In some embodiments, the particle size of the nano-Si crystalline grains is less than about 50 nm. In some embodiments, the particle size of the nano-Si crystalline grains is less than about 20 nm. In some embodiments, the particle size of the nano-Si crystalline grains is less than about 5 nm. In some embodiments, the particle size of the nano-Si crystalline grains is less than about 2 nm. In some embodiments, the particle size of the nano-Si crystalline grains is less than about 0.5 nm.

In some embodiments, the anode material further comprises an oxide $MeO_y$ layer, which coats at least a portion of the silicon composite substrate, wherein Me includes at least one of Al, Si, Ti, Mn, V, Cr, Co or Zr, and y is about 0.5 to 3; wherein the oxide $MeO_y$ layer comprises a carbon material.

In some embodiments, the oxide $MeO_y$ includes $Al_2O_3$, $SiO_2$, $TiO_2$, $Mn_2O_3$, $MnO_2$, $CrO_3$, $Cr_2O_3$, $CrO_2$, $V_2O_5$, VO, CoO, $Co_2O_3$, $Co_3O_4$, $ZrO_2$, or any combination thereof.

In some embodiments, the carbon material in the oxide $MeO_y$ layer includes amorphous carbon, carbon nanotubes, carbon nanoparticles, carbon fibers, graphene, or any combination thereof. In some embodiments, the amorphous carbon is a carbon material obtained by sintering a carbon precursor at high temperature. In some embodiments, the carbon precursor includes polyvinylpyrrolidone, sodium carboxymethyl cellulose, polyvinyl alcohol, polypropylene, phenolic resin, polyester resin, polyamide resin, epoxy resin, polyurethane, polyacrylic resin or any combination thereof.

In some embodiments, the thickness of the oxide $MeO_y$ layer is about 0.5 nm to 1000 nm. In some embodiments, the thickness of the oxide $MeO_y$ layer is about 1 nm to 500 nm. In some embodiments, the thickness of the oxide $MeO_y$ layer is about 1 nm to 100 nm. In some embodiments, the thickness of the oxide $MeO_y$ layer is about 1 nm to 20 nm. In some embodiments, the thickness of the oxide $MeO_y$ layer is about 2 nm, about 10 nm, about 20 nm, or about 50 nm.

In some embodiments, based on the total weight of the anode material, the weight percentage of the Me element is about 0.005 to 1 wt %. In some embodiments, based on the total weight of the anode material, the weight percentage of the Me element is about 0.01 to 1 wt %. In some embodiments, based on the total weight of the anode material, the weight percentage of the Me element is about 0.02 to 0.9 wt %. In some embodiments, based on the total weight of the anode material, the weight percentage of the Me element is about 0.05 wt %, about 0.1 wt %, about 0.2 wt %, about 0.3 wt %, about 0.4 wt %, about 0.5 wt %, about 0.6 wt %, about 0.7 wt % or about 0.8 wt %.

In some embodiments, based on the total weight of the anode material, the weight percentage of the carbon material in the oxide $MeO_y$ layer is about 0.01 to 1 wt %. In some embodiments, based on the total weight of the anode material, the weight percentage of the carbon material in the oxide $MeO_y$ layer is about 0.1 to 0.9 wt %. In some embodiments, based on the total weight of the anode material, the weight percentage of the carbon material in the oxide MeO$_y$ layer is about 0.2 to 0.8 wt %. In some embodiments, based on the total weight of the anode material, the weight percentage of the carbon material in the oxide MeO$_y$ layer is about 0.3 wt %, about 0.4 wt %, about 0.5 wt %, about 0.6 wt %, or about 0.7 wt %.

In some embodiments, the anode material further comprises a polymer layer that coats at least a portion of the oxide MeO$_y$ layer, wherein the polymer layer comprises a carbon material.

In some embodiments, the polymer layer comprises polyvinylidene fluoride and its derivatives, carboxymethyl cellulose and its derivatives, sodium carboxymethyl cellulose and its derivatives, polyvinylpyrrolidone and its derivatives, polyacrylic acid and its derivatives, polystyrene-butadiene rubber, polyacrylamide, polyimide, polyamideimide or any combination thereof.

In some embodiments, the carbon material in the polymer layer includes, carbon nanotubes, carbon nanoparticles, carbon fibers, graphene, or any combination thereof.

In some embodiments, based on the total weight of the anode material, the weight percentage of the polymer layer is about 0.05 to 5 wt %. In some embodiments, based on the total weight of the anode material, the weight percentage of the polymer layer is about 0.1 to 4 wt %. In some embodiments, based on the total weight of the anode material, the weight percentage of the polymer layer is about 0.5 to 3 wt %. In some embodiments, based on the total weight of the anode material, the weight percentage of the polymer layer is about 1 wt %, about 1.5 wt %, or about 2 wt %.

In some embodiments, the thickness of the polymer layer is about 1 to 100 nm. In some embodiments, the thickness of the polymer layer is about 5 to 90 nm. In some embodiments, the thickness of the polymer layer is about 10-80 nm. In some embodiments, the thickness of the polymer layer is about 5 nm, about 20 nm, about 30 nm, about 40 nm, about 50 nm, about 60 nm or about 70 nm.

In some embodiments, the anode material has a specific surface area of about 1 to 50 m$^2$/g. In some embodiments, the anode material has a specific surface area of about 5 to 40 m$^2$/g. In some embodiments, the anode material has a specific surface area of about 10 to 30 m$^2$/g. In some embodiments, the anode material has a specific surface area of about 1 m$^2$/g, about 5 m$^2$/g, or about 10 m$^2$/g.

II. Preparation Method of an Anode Material

An embodiment of the present application provides a method for preparing any of the above anode materials, which comprises:

mixing silicon dioxide and metal silicon powder at a molar ratio of about 1:5 to 5:1 to obtain a mixed material;
heating the mixed material under about 10$^{-4}$ to 10$^{-1}$ kPa, at a temperature range of about 1100 to 1550° C. for about 0.5-24 hr to obtain a gas;
condensing the gas obtained to obtain a solid;
crushing and screening the solid to obtain an anode material; and
heat-treating the solid at a temperature range of about 400° C. to 1200° C. for 1 to 24 hr, and cooling to obtain an anode active material.

In some embodiments, the molar ratio of the silicon dioxide to the metal silicon powder is about 1:4 to 4:1. In some embodiments, the molar ratio of the silicon dioxide to the metal silicon powder is about 1:3 to 3:1. In some embodiments, the molar ratio of the silicon dioxide to the metal silicon powder is about 1:2 to 2:1. In some embodiments, the molar ratio of the silicon dioxide to the metal silicon powder is about 1:1.

In some embodiments, the pressure is in the range of about 10$^{-4}$ to 10$^{-1}$ kPa. In some embodiments, the pressure is about 1 Pa, about 10 Pa, about 20 Pa, about 30 Pa, about 40 Pa, about 50 Pa, about 60 Pa, about 70 Pa, about 80 Pa, about 90 Pa or about 100 Pa.

In some embodiments, the heating temperature is about 1100 to 1550° C. In some embodiments, the heating temperature is about 1200° C., about 1400° C. or about 1450° C.

In some embodiments, the heating temperature is about 1 to 24 hr. In some embodiments, the heating temperature is about 5-20 hr. In some embodiments, the heating time is about 2 hr, about 4 hr, about 6 hr, about 8 hr, about 10 hr, about 12 hr, about 14 hr, about 16 hr or about 18 hr.

In some embodiments, the mixing is performed with a ball mill, a V-type mixer, a three-dimensional mixer, an airflow mixer or a horizontal mixer.

In some embodiments, the heating and heat treatment are carried out under an inert gas atmosphere. In some embodiments, the inert gas includes nitrogen, argon, helium or a combination thereof.

In some embodiments, after screening, the method further comprises a heat treatment step.

In some embodiments, the temperature of the heat treatment is about 400 to 1500° C. In some embodiments, the temperature of the heat treatment is about 400 to 1200° C. In some embodiments, the temperature of the heat treatment is about 600° C., about 800° C., or about 1000° C.

In some embodiments, the time of the heat treatment is about 1-24 hr. In some embodiments, the time of the heat treatment is about 2-12 hr. In some embodiments, the time of the heat treatment is about 5 hr, about 10 hr or about 15 hr.

In some embodiments, the method further comprises a step of coating the oxide MeO$_y$ layer, comprising:

(1) forming the crushed and screened solid, a carbon precursor and an oxide precursor MeTe into a mixed solution in the presence of an organic solvent and deionized water;
(2) drying the mixed solution to obtain powder; and
(3) sintering the powder at about 250 to 900° C. for about 0.5 to 24 hr, to obtain an anode material with an oxide MeO$_y$ layer on the surface thereof,
wherein y is about 0.5 to 3,
wherein Me includes at least one of Al, Si, Ti, Mn, Cr, V, Co or Zr,
wherein T includes at least one of methoxy, ethoxy, isopropoxy or halogen, and
wherein n is 1, 2, 3 or 4.

In some embodiments, the oxide precursor MeT$_n$ includes isopropyl titanate, aluminum isopropoxide, or a combination thereof.

In some embodiments, the carbon precursor includes carbon nanotubes, carbon nanoparticles, carbon fibers, graphene, polyvinylpyrrolidone, sodium carboxymethyl cellulose, polyvinyl alcohol, polypropylene, phenolic resin, polyester resin, polyamide resin, epoxy resin, polyurethane, polyacrylic resin or any combination thereof.

In some embodiments, the sintering temperature is about 300 to 800° C. In some embodiments, the sintering temperature is about 400 to 700° C. In some embodiments, the sintering temperature is about 400 to 650° C. In some embodiments, the sintering temperature is about 500° C. or about 600° C.

In some embodiments, the sintering time is about 1 to 20 hr. In some embodiments, the sintering time is about 1 to 15 hr. In some embodiments, the sintering time is about 1 to 10 hr. In some embodiments, the sintering time is about 1.5 to 5 hr. In some embodiments, the sintering time is about 2 hr, about 3 hr, or about 4 hr.

In some embodiments, the organic solvent includes at least one of ethanol, methanol, n-hexane, N,N-dimethylformamide, pyrrolidone, acetone, toluene, isopropanol or n-propanol. In some embodiments, the organic solvent is ethanol.

In some embodiments, the halogen includes F, Cl, Br, or a combination thereof.

In some embodiments, the sintering is carried out under an inert gas atmosphere. In some embodiments, the inert gas includes nitrogen, argon, or a combination thereof.

In some embodiments, the drying is spray drying, and the drying temperature is about 100 to 300° C.

In some embodiments, the method further comprises a step of coating the polymer layer, comprising:
(4) dispersing the above-mentioned crushed and screened solid or the anode material with the oxide $MeO_y$ layer on the surface thereof, a carbon material and a polymer in a solvent at high speed for 1 to 12 hr to obtain a suspension liquid; and
(5) removing the solvent from the suspension liquid.

In some embodiments, the polymer comprises polyvinylidene fluoride and its derivatives, carboxymethyl cellulose and its derivatives, sodium carboxymethyl cellulose and its derivatives, polyvinylpyrrolidone and its derivatives, polyacrylic acid and its derivatives, polystyrene-butadiene rubber, polyacrylamide, polyimide, polyamideimide or any combination thereof.

In some embodiments, the carbon material includes carbon nanotubes, carbon nanoparticles, carbon fibers, graphene, or any combination thereof.

In some embodiments, the solvent includes water, ethanol, methanol, tetrahydrofuran, acetone, chloroform, N-methylpyrrolidone, dimethylformamide, dimethylacetamide, toluene, xylene or any combination thereof.

Figure 1:
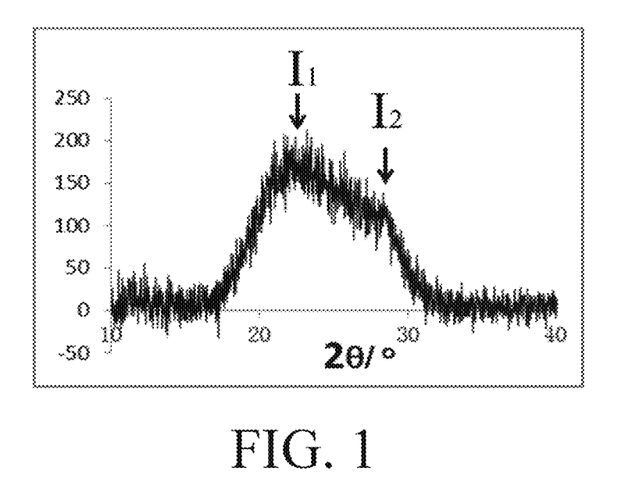
FIG. 1 shows an X-ray diffraction (XRD) pattern of the anode active material in Example 2 of the present application.

FIG. 1 shows an X-ray diffraction (XRD) pattern of an anode active material in Example 2 of the present application. As can be seen from FIG. 1, in the X-ray diffraction pattern of the anode active material, the highest intensity at 2θ within the range of 28.0° to 29.0° is $I_2$, and the highest intensity at 2θ within the range of 20.5° to 21.5° is $I_1$, wherein $0<I_2/I_1 \leq 1$. The $I_2/I_1$ value reflects the influence degree of disproportionation to the material. The larger the $I_2/I_1$ value is, the larger the size of the nano-silicon crystalline grains inside the anode active material will be. When the $I_2/I_1$ value is greater than 1, the stress in a local region of the anode active material will sharply increase during intercalation of the lithium, so that the structure of the anode active material is degraded during the cycle process. In addition, due to the generation of the distribution of nanocrystals, the diffusion capacity of the ions in the grain boundary during diffusion of the ions will be affected. The inventor of the present application finds that when the $I_2/I_1$ value meets $0<I_2/I_1 \leq 1$, the anode active material has good cycle performance, and the lithium ion battery prepared at the same has good swelling resistance.

Figure 2:
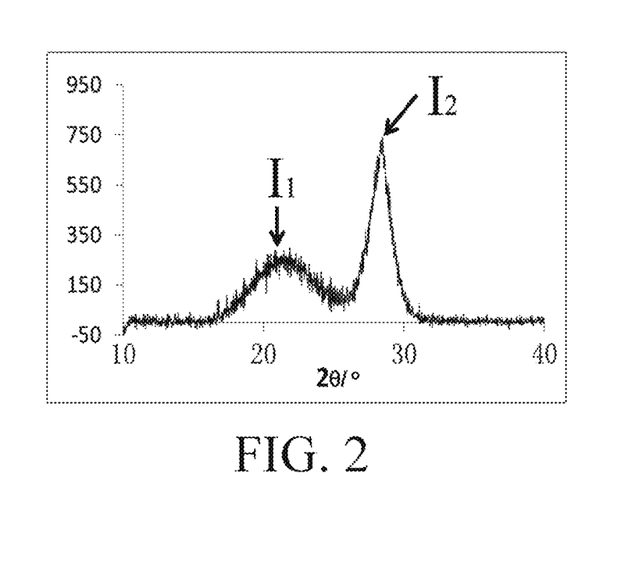
FIG. 2 shows an X-ray diffraction (XRD) pattern of the anode active material in Comparative Example 1 of the present application.

FIG. 2 shows an X-ray diffraction (XRD) pattern of an anode active material in Comparative Example 1 of the present application. It can be seen from FIG. 2 that the anode active material of Comparative Example 1 has an $I_2/I_1$ value that is significantly greater than 1. Compared with the anode active material of Example 2, the anode active material of Comparative Example 1 has poor cycle performance, and the lithium ion battery prepared with the same has a high swelling rate and poor rate performance.

Figure 3:
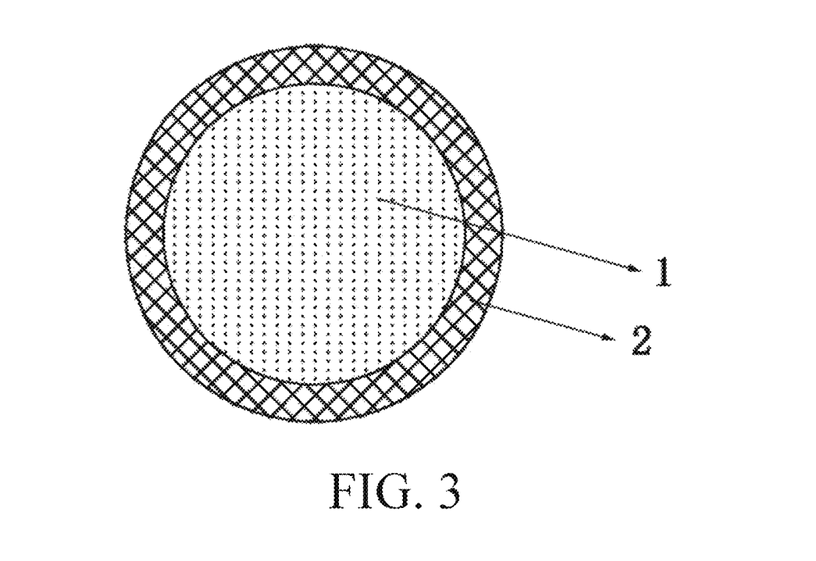
FIG. 3 illustrates a schematic structural diagram of the anode active material in an example of the present application.

FIG. 3 illustrates a schematic structural diagram of an anode active material in an example of the present application. The inner layer 1 is a silicon composite substrate, and the outer layer 2 is an oxide $MeO_y$ layer containing a carbon material.

The oxide $MeO_y$ layer coating the silicon composite substrate can act as an HF trapping agent, and the oxide can react with HF in the electrolytic solution to reduce the content of HF in the electrolytic solution during the cycle process, and reduce the etching of HF on the surface of the silicon material, thereby further improving the cycle performance of the material. Doping a carbon material in the oxide $MeO_y$ layer is beneficial for the formation of lithium ion conductors after intercalation of the lithium during the first charge and discharge process, and is beneficial for achieving the conduction of ions. In addition, doping a certain amount of carbon in the oxide $MeO_y$ layer can enhance the conductivity of the anode active material.

Figure 4:
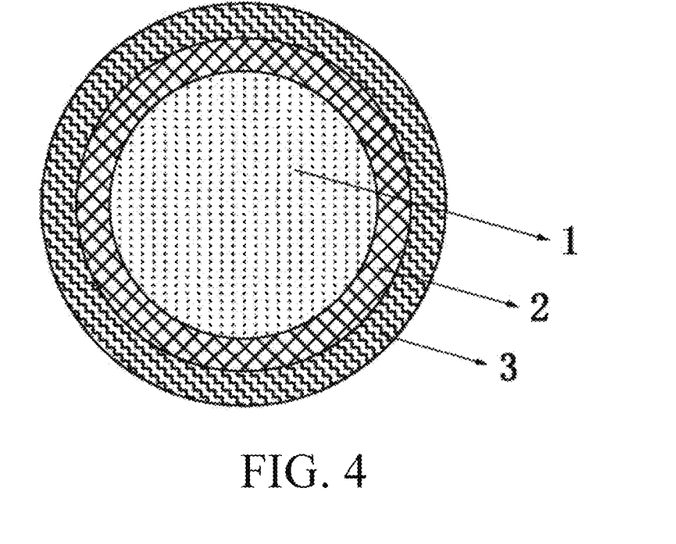
FIG. 4 illustrates a schematic structural diagram of the anode active material in another example of the present application.

FIG. 4 illustrates a schematic structural diagram of an anode active material in another example of the present application. The inner layer 1 is a silicon composite substrate, the middle layer 2 is an oxide $MeO_y$ layer containing a carbon material, and the outer layer 3 is a polymer layer containing a carbon material. The anode active material of the present application may only have the silicon composite substrate and the polymer layer, but is free of a $MeO_y$ layer. That is, the polymer layer of the present application can be directly coated on the surface of the silicon composite substrate.

When a polymer layer containing carbon nanotubes (CNT) is coated on the surface of the anode active material, the CNTs can be bound to the surface of the anode active material by the polymer, which is beneficial for the improvement of the interface stability of the CNTs on the surface of the anode active material, thereby improving cycle performance.

Figure 5:
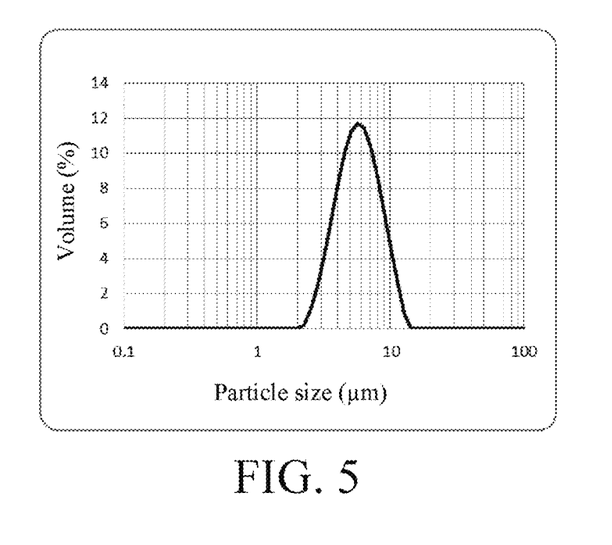
FIG. 5 shows a volume basis particle size distribution curve of the anode active material in Example 2 of the present application.

FIG. 5 shows a volume basis particle size distribution curve of the anode active material in Example 2. It can be seen from FIG. 5 that the particle size distribution of the anode active material particles of Example 2 is relatively uniform, and narrow. The lithium ion battery prepared with the anode active material of Example 2 shows a satisfactory cycle performance and swelling resistance.

Figure 6:
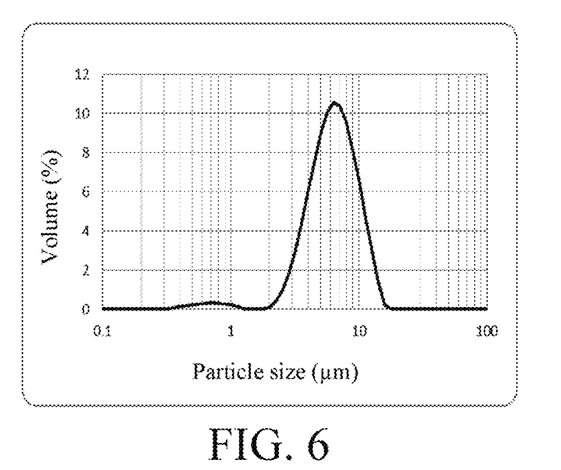
FIG. 6 shows a volume basis particle size distribution curve of the anode active material in Comparative Example 2 of the present application.

FIG. 6 shows a volume basis particle size distribution curve of the anode active material in Comparative Example 2. It can be seen from FIG. 6 that the anode active material of Comparative Example 2 has a certain number of small particles, so the cycle performance is poor. The presence of small fine particles accelerates the etching of the particles by the electrolytic solution and thus accelerates the deterioration of the cycle performance. Moreover, since the small particles are quickly etched by the electrolytic solution, a large amount of by-products are produced on the surface, so the swelling resistance of the lithium ion battery prepared with the same is poorer than the swelling resistance of the lithium ion battery prepared with the anode active material of Comparative Example 2.

Figure 7:
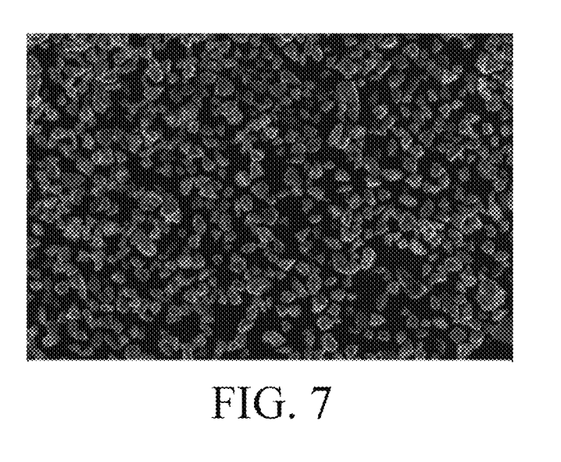
FIG. 7 shows a scanning electron microscopy (SEM) image of the anode active material in Example 2 of the present application.
Figure 8:
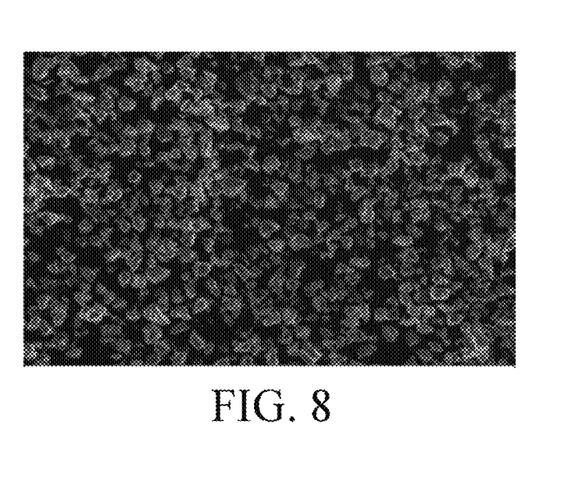
FIG. 8 shows a scanning electron microscopy (SEM) image of the anode active material in Comparative Example 2 of the present application.

FIGS. 7 and 8 show scanning electron microscopy (SEM) images of the anode active materials in Example 2 and Comparative Example 2, respectively. The particle size distribution can be visually observed from FIGS. 7 and 8. FIG. 8 shows that a certain number of small particles are present in the anode active material of Comparative Example 2.

III. Anode

The embodiments of the present application provide an anode. The anode includes a current collector and an anode active material layer located on the current collector. The anode active material layer includes an anode material according to the embodiments of the present application.

In some embodiments, the anode active material layer comprises a binder. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene-butadiene rubber, acrylic styrene butadiene rubber, epoxy resin, Nylon and so on.

In some embodiments, the anode active material layer comprises a conductive material. In some embodiments, the conductive material includes, but is not limited to, natural graphite; artificial graphite; carbon black; acetylene black; Ketjen black; carbon fibers; metal powder; metal fibers; copper; nickel; aluminum; silver; or polyphenylene derivatives.

In some embodiments, the current collector includes, but is not limited to, a copper foil, a nickel foil, a stainless steel foil, a titanium foil, nickel foam, copper foam, or a polymeric substrate coated with a conductive metal.

In some embodiments, the anode can be obtained by mixing an active material, a conductive material, and a binder in a solvent to prepare an active material composition, and coating the active material composition on a current collector.

In some embodiments, the solvent may include, but is not limited to, N-methylpyrrolidone or the like.

IV. Cathode

A material capable of being applied to a cathode in the embodiment of the present application, a composition and a preparation method thereof include any technology disclosed in prior art. In some embodiments, the cathode is a cathode disclosed in U.S. Pat. No. 9,812,739B, which is incorporated into the present application by full text reference.

In some embodiments, the cathode includes a current collector and a cathode active material layer on the current collector.

In some embodiments, the cathode active material includes, but is not limited to, lithium cobalt oxide (LiCoO$_2$), lithium nickel cobalt manganese (NCM) ternary material, lithium iron phosphate (LiFePO$_4$), or lithium manganese oxide (LiMn$_2$O$_4$).

In some embodiments, the cathode active material layer further comprises a binder, and optionally a conductive material. The binder improves the binding of the cathode active material particles to each other and the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene-butadiene rubber, acrylated styrene-butadiene rubber, epoxy resins, Nylon and so on.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, Ketjen black, carbon fiber, or any combinations thereof. In some embodiments, the metal based material is selected from metal powders, metal fibers, copper, nickel, aluminum, and silver. In some embodiments, the conductive polymer is a polyphenylene derivative.

In some embodiments, the current collector includes, but is not limited to, aluminum.

The cathode may be prepared by a preparation method well known in the art. For example, the cathode can be obtained by the following method: mixing an active material, a conductive material and a binder in a solvent to prepare an active material composition, and coating the active material composition on a current collector. In some embodiments, the solvent may include, but is not limited to, N-methylpyrrolidone or the like.

V. Electrolytic Solution

An electrolytic solution that can be used in the embodiments of the present application may be an electrolytic solution known in prior art.

In some embodiments, the electrolytic solution comprises an organic solvent, a lithium salt, and an additive. The organic solvent used in the electrolytic solution according to the present application may be any organic solvent known in the art and capable of serving as a solvent of the electrolytic solution. The electrolyte used in the electrolytic solution according to the present application is not limited, and may be any electrolyte known in the art. The additive used in the electrolytic solution according to the present application may be any additive known in the art and capable of serving as an additive of the electrolytic solution.

In some embodiments, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of an organic lithium salt or an inorganic lithium salt.

In some embodiments, the lithium salt includes, but is not limited to, lithium hexafluorophosphate (LiPF$_6$), lithium tetrafluoroborate (LiBF$_4$), lithium difluorophosphate (LiPO$_2$F$_2$), lithium bis(trifluoromethanesulfonyl)imide LiN(CF$_3$SO$_2$)$_2$ (LiTFSI), lithium bis(fluorosulfonyl) imide Li(N(SO$_2$F)$_2$) (LiFSI), lithium bis(oxalato)borate LiB(C$_2$O$_4$)$_2$ (LiBOB) or lithium difluoro(oxalato)borate LiBF$_2$(C$_2$O$_4$) (LiDFOB).

In some embodiments, the concentration of the lithium salt in the electrolytic solution is about 0.5 to 3 mol/L, about 0.5 to 2 mol/L, or about 0.8 to 1.5 mol/L.

VI. Separator

In some embodiments, a separator is disposed between the cathode and the anode to prevent a short circuit. The material and shape of the separator that can be used in the embodiments of the present application are not particularly limited, and may be any technology disclosed in prior art. In some embodiments, the separator includes a polymer or an inorganic substance formed by a material stable in the electrolytic solution of the present application.

For example, the separator may include a substrate layer and a surface treatment layer. The substrate layer is a non-woven fabric, a film or a composite film having a porous structure. The material of the substrate layer is selected from at least one of polyethylene, polypropylene, polyethylene terephthalate and polyimide. Specifically, a porous polypropylene film, a porous polyethylene film, a polypropylene non-woven fabric, a polyethylene non-woven fabric, or a porous polypropylene-polyethylene-polypropylene composite film may be used.

The surface treatment layer is disposed on at least one surface of the substrate layer. The surface treatment layer may be a polymer layer or an inorganic substance layer, or a layer formed by mixing the polymer and the inorganic substance.

The inorganic substance layer includes inorganic particles and a binder. The inorganic particles are one or a combination of several selected from the group consisting of aluminum oxide, silicon oxide, magnesium oxide, titanium oxide, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is one or a combination of several selected from the group consisting of polyvinylidene fluoride, a vinylidene fluoride-hexafluoropropylene copolymer, polyamide, polyacrylonitrile, polyacrylic ester, polyacrylic acid, polyacrylate, polyvinylpyrrolidone, polyvinyl ether, polymethyl methacrylate, polytetrafluoroethylene and polyhexafluoropropylene.

The polymer layer includes a polymer, and the material of the polymer is selected from at least one of polyamide, polyacrylonitrile, an acrylate polymer, polyacrylic acid, polyacrylate, polyvinylpyrrolidone, polyvinyl ether, polyvinylidene fluoride or poly(vinylidene fluoride-hexafluoropropylene).

VII. Electrochemical Device

The embodiments of the present application provide an electrochemical device including any device that undergoes an electrochemical reaction.

In some embodiments, the electrochemical device of the present application includes a cathode having a cathode active material capable of occluding and releasing metal ions; an anode according to the embodiments of the present application; an electrolytic solution; and a separator disposed between the cathode and the anode.

In some embodiments, the electrochemical device of the present application includes, but is not limited to, all types of primary batteries, secondary batteries, fuel cells, solar cells, or capacitors.

In some embodiments, the electrochemical device is a lithium secondary battery.

In some embodiments, the lithium secondary battery includes, but is not limited to, a lithium metal secondary battery, a lithium ion secondary battery, a lithium polymer secondary battery, or a lithium ion polymer secondary battery.

Viii. Electronic Device

The electronic device of the present application may be any device using the electrochemical device according to the embodiments of the present application.

In some embodiments, the electronic device includes, but is not limited to, a notebook computer, a pen input computer, a mobile computer, an e-book player, a portable phone, a portable fax machine, a portable copy machine, a portable printer, a stereo headphone, a video recorder, a liquid crystal display television, a portable cleaner, a portable CD player, a minidisc player, a transceiver, an electronic notebook, a calculator, a memory card, a portable recorder, a radio, a backup power supply, a motor, a car, a motorcycle, a power-assisted bicycle, a bicycle, a lighting fixture, a toy, a game console, a clock, an electric tool, a flash light, a camera, a large household storage battery, or a lithium ion capacitor, and the like.

The lithium ion battery is taken as an example and the preparation of the lithium-ion battery is described in conjunction with specific embodiments. Those skilled in the art would understand that the preparation method described in the present application is only an example, and any other suitable preparation methods are within the scope of the present application.

Embodiment

The following describes embodiments of the lithium-ion battery according to the present application and comparative examples for performance evaluation.

Performance Evaluation Method for Anode Active Materials

1. Test Method for Powder Properties of Anode Active Materials (1) Microscopic Morphology Observation of Powder Particles:

The microscopic morphology of a powder was observed by scanning electron microscopy to characterize the coating on the surface of the material. The test instrument was an OXFORD EDS (X-max—20 $mm^2$), the acceleration voltage was 15 KV, the focal length was adjusted, the observation was made at 50K high magnification, and the agglomeration condition of the particles was observed at a low magnification of 500 to 2000.

(2) Specific Surface Area Test:

Specific surface area test: At a constant low temperature, after the adsorption amounts of gas on a solid surface at different relative pressures were measured, the adsorption amount of a monomolecular layer of a test sample was obtained based on the Brunauer-Emmett-Teller adsorption theory and its formula (BET formula), thereby calculating the specific surface area of the solid.

About 1.5 to 3.5 g of a powder sample was loaded into a test sample tube of a TriStar II 3020, and then was degassed at about 200° C. for 120 min and then tested.

(3) Particle Size Test:

About 0.02 g of the powder sample was added to a 50 ml clean beaker, about 20 ml of deionized water was added, and then a few drops of 1% surfactant was added to disperse the powder completely in water. Performing an ultrasonic treatment for 5 min in a 120 W ultrasonic cleaning machine, the particle size distribution was then measured by a MasterSizer 2000.

(4) Carbon Content Test:

The sample was heated and burned in a high-frequency furnace at a high temperature under an oxygen-enriched atmosphere to oxidize carbon and sulfur into carbon dioxide and sulfur dioxide, respectively. The gas was allowed to enter a corresponding absorption tank after treatment, and the corresponding infrared radiation was absorbed and converted into a corresponding signal by the detector. This signal was sampled by a computer, and converted into a value proportional to the concentration of carbon dioxide and sulfur dioxide after linear correction, and then the values throughout the entire analysis process were accumulated. After the analysis was completed, the accumulated value was divided by the weight in the computer, and then multiplied by the correction coefficient, and the blank was subtracted, to obtain the percentage content of carbon and sulfur in the sample. The sample was tested using a Shanghai Dekai HCS-140 high-frequency infrared carbon-sulfur analyzer.

(5) XRD Test:

to 2.0 g of the sample was added to a groove of a glass sample holder, compacted and flattened with a glass sheet, and tested using a Brook D8 X-ray diffractometer according to JJS K 0131-1996 "General rules for X-ray diffraction analysis". The test voltage was 40 kV, the current was 30 mA, the scanning angle was in the range of 10-85°, the scanning step size was 0.0167°, and the time for each step was 0.24 s. An XRD pattern was obtained, from which the highest intensity $I_2$ at 2θ of 28.4° and the highest intensity $I_1$ at 2θ of 21.0° were obtained, and the ratio of $I_2/I_1$ was calculated.

(6) Metal Element Test:

A certain amount of the sample was weighed, added with an amount of concentrated nitric acid, and digested under microwave to obtain a solution. The obtained solution and filter residue were washed multiple times and diluted to a certain volume. The plasma intensities of the metal elements were tested by ICP-OES, the metal contents in the solution were calculated according to the standard curves of the tested metals, and then the amounts of the metal elements contained in the material were calculated.

The weight percentage of each substance in the following tables was calculated based on the total weight of the anode active material.

II. Test Method of Electrical Properties of Anode Active Materials

1. Test Method for Button Battery

Under a dry argon atmosphere, $LiPF_6$ was added to a mixed solvent of propylene carbonate (PC), ethylene carbonate (EC), and diethyl carbonate (DEC) (at a weight ratio of about 1:1:1), and then uniformly mixed, wherein the concentration of $LiPF_6$ was about 1.15 mol/L. About 7.5 wt % of fluoroethylene carbonate (FEC) was added, and mixed uniformly to obtain an electrolytic solution.

The anode active material obtained in the examples and comparative examples, conductive carbon black and a modified polyacrylic acid (PAA) binder were added to deionized water at a weight ratio of about 80:10:10, and were stirred to form a slurry. A scraper was used for coating to form a coating layer with a thickness of 100 μm. The coating layer was dried in a vacuum drying oven at about 85° C. for about 12 hr, and then cut into a wafer with a diameter of about 1 cm with a punching machine in a dry environment. In a glove box, a lithium metal sheet was used as a counter electrode, and a Celgard composite membrane was used as a separator, and an electrolytic solution was added to assemble a button battery. A LAND series battery test was used to perform charge and discharge tests on the battery to test the charge and discharge capacity of the battery. The first Coulombic efficiency was the ratio of the charge capacity to the discharge capacity.

2. Whole Battery Test (1) Preparation of the Lithium-Ion Battery

Preparation of the Cathode:

$LiCoO_2$, conductive carbon black and polyvinylidene fluoride (PVDF) were fully stirred and mixed in an N-methylpyrrolidone solvent system at a weight ratio of about 95%:2.5%:2.5%, to prepare a cathode slurry. The cathode slurry prepared was coated on an aluminum foil as a cathode current collector, dried, and then cold-pressed to obtain the cathode.

Preparation of the Anode:

Graphite, the anode active material prepared according to the examples and comparative examples, a conductive agent (conductive carbon black, Super P®), and the PAA binder were mixed at a weight ratio of about 70%:15%:5%:10%, an appropriate amount of water was added, and kneaded at a solid content of about 55-70 wt %. An appropriate amount of water was added to adjust the viscosity of the slurry to about 4000-6000 Pa·s, to prepare an anode slurry.

The anode slurry prepared was coated on a copper foil as an anode current collector, dried, and then cold-pressed to obtain the anode.

Preparation of the Electrolytic Solution

Under a dry argon atmosphere, $LiPF_6$ was added to a mixed solvent of propylene carbonate (PC), ethylene carbonate (EC), and diethyl carbonate (DEC) (at a weight ratio of about 1:1:1), and uniformly mixed, wherein the concentration of $LiPF_6$ was about 1.15 mol/L. About 7.5 wt % of fluoroethylene carbonate (FEC) was added, and uniformly mixed to obtain an electrolytic solution.

Preparation of the Separator

A porous PE polymer film was used as a separator.

Preparation of the Lithium-Ion Battery

The cathode, separator, and anode were stacked in an order such that the separator was located between the cathode and anode to isolate the cathode and anode, and a battery cell was obtained by winding. The battery cell was placed in an outer package, and the electrolytic solution was injected, and the outer package was packaged. After formation, degassing, trimming and other processes, the lithium ion battery was obtained.

(2) Cycle Performance Test:

The test temperature was 25/45° C. The battery was charged to 4.4 V at a constant current of 0.7 C and then charged to 0.025 C at a constant voltage, allowed to stand for 5 min, and discharged to 3.0 V at 0.5 C. The capacity obtained in this step was the initial capacity. The cycle of charge at 0.7 C/discharge at 0.5 C was repeated, and ratio of the capacity of each step to the initial capacity was obtained, from which a capacity attenuation curve was obtained. The cycle number at 25° C. to a capacity retention rate of 90% was recorded as the room-temperature cycle performance of the battery, and the cycle number at 45° C. to a capacity retention rate of 80% was recorded as the high-temperature cycle performance of the battery. The cycle performances of the materials were compared by comparing the cycle number in the above two conditions.

(3) Discharge Rate Test:

At 25° C., the battery was discharged to 3.0 V at 0.2 C, allowed to stand for 5 min, charged to 4.45 V at 0.5 C, charged to 0.05 C at a constant voltage, and allowed to stand for 5 min. The discharge rate was adjusted, and the battery was respectively discharged at 0.2 C, 0.5 C, 1 C, 1.5 C, and 2.0 C, to obtain the discharge capacity. The capacity obtained at each rate and the capacity obtained at 0.2 C were compared. The rate performance was compared by comparing the ratios at 2 C and 0.2 C.

(4) Swelling Rate Test of a Battery After Full Charge

The thickness of a fresh battery of half charge (50% state of charge (SOC)) was measured by a screw micrometer. After 400 cycles, the thickness of the battery of full charge (100% SOC) was measured by a screw micrometer, and compared with the thickness of the initial fresh battery of half charge (50% SOC), to obtain the swelling rate of the fully charged (100% SOC) battery at this time.

III. Preparation of the Anode Active Material

1. The Anode Active Materials in Examples 1 to 3 and Comparative Example 1 were Prepared as Follows:

(1) Silicon dioxide and metal silicon powder were mixed at a molar ratio of about 1:1 by mechanical dry mixing and ball milling to obtain a mixed material;

(2) The mixed material was heated for about 0.5 to 24 hr at a temperature range of about 1100 to 1550° C., under an Are atmosphere, and under a pressure of about $10^{-3}$-$10^{-1}$ kPa to obtain a gas;

(3) The gas obtained was condensed to obtain a solid;

(4) The solid was crushed and screened; and (5) The solid was heat-treated at a temperature range of 400° C. to 1200° C. for about 1 to 24 hr under a nitrogen atmosphere, and the heat-treated solid was cooled to obtain an anode active material.

Table 1-1 shows the specific process parameters in Examples 1 to 3 and Comparative Example 1.

TABLE 1-1

| No. | SiO$_2$:Si (molar ratio) | Pressure (Pa) | Heating temperature (° C.) | Heating time (h) | Grading treatment | Heat treatment after grading |
|---|---|---|---|---|---|---|
| Example 1 | 1:1 | 10 | 1350 | 20 | Airstream crushing + grading multiple times | — |
| Example 2 | 1:1 | 10 | 1350 | 20 | Airstream crushing + grading multiple times | 600° C., 2 h |
| Example 3 | 1:1 | 10 | 1350 | 20 | Airstream crushing + grading multiple times | 800° C., 2 h |
| Comparative Example 1 | 1:1 | 10 | 1350 | 20 | Airstream crushing + grading multiple times | 1000° C., 2 h |

Table 1-2 and Table 1-3 show the performance test results of the anode active materials in Examples 1 to 3 and Comparative Example 1.

TABLE 1-2

| No. | $I_2/I_1$ | Carbon content (wt %) | Specific surface area (m$^2$·g$^{-1}$) | Dn10/ Dv50 | Capacity per gram * (mAh·g$^{-1}$) | First efficiency (%) |
|---|---|---|---|---|---|---|
| Example 1 | 0.41 | 0.028 | 1.25 | 0.51 | 1680 | 69.5% |
| Example 2 | 0.64 | 0.031 | 1.31 | 0.51 | 1672 | 68.7% |
| Example 3 | 1 | 0.027 | 1.28 | 0.51 | 1687 | 68.9% |
| Comparative Example 1 | 2.5 | 0.030 | 1.35 | 0.51 | 1684 | 69.2% |

TABLE 1-3

| No. | Number of cycles at 25° C. to 90% | Number of cycles at 45° C. to 80% | Swelling rate of battery after 400 cycles at 45° C. | Rate performance |
|---|---|---|---|---|
| Example 1 | 400 | 380 | 7.8% | 85.1% |
| Example 2 | 390 | 375 | 7.9% | 84.8% |
| Example 3 | 350 | 360 | 8.3% | 84.1% |
| Comparative Example 1 | 280 | 250 | 9.8% | 82.1% |

From the test results of Examples 1 to 3, it can be seen that when the $I_2/I_1$ value meets 0<$I_2/I_1$≤1, the lithium-ion battery has good cycle performance and rate performance, and a lower swelling rate. From the test results of Comparative Example 1, it can be seen that when the $I_2/I_1$ value is greater than 1, the cycle performance and rate performance of the lithium-ion battery are poor, and the swelling rate is high.

2. Several Anode Active Materials with Different Dn10/Dv50 Values were Prepared by a Grading Method The anode active materials in Examples 4 to 6 and Comparative Examples 2 and 3 were prepared as follows:

(1) An anode active material with an $I_2/I_1$ value of 0.64 was prepared according to the above method; and (2) The material was graded.

Table 2-1 and Table 2-2 show the performance test results of the anode active materials in Examples 4 to 6 and Comparative Examples 2 and 3.

TABLE 2-1

| $I_2/I_1$ = 0.64 | Dv50 (μm) | Dn10/ Dv50 | Carbon content (wt %) | Specific surface area/ (m$^2$·g$^{-1}$) | Capacity per gram *(mAh·g$^{-1}$) | First efficiency |
|---|---|---|---|---|---|---|
| Example 4 | 5.0 | 0.3 | 0.028 | 1.56 | 1672 | 68.8% |
| Example 5 | 5.0 | 0.5 | 0.030 | 1.42 | 1683 | 69.0% |
| Example 6 | 5.0 | 0.6 | 0.029 | 1.23 | 1682 | 69.2% |
| Comparative Example 2 | 5.0 | 0.05 | 0.031 | 3.78 | 1681 | 68.1% |
| Comparative Example 3 | 5.0 | 0.7 | 0.028 | 1.18 | 1680 | 68.2% |

TABLE 2-2

| No. | Number of cycles at 25° C. to 90% | Number of cycles at 45° C. to 80% | Swelling rate of battery after 400 cycles at 45° C. | Rate performance |
|---|---|---|---|---|
| Example 4 | 375 | 350 | 8.0% | 84.6% |
| Example 5 | 390 | 375 | 7.9% | 84.8% |
| Example 6 | 393 | 390 | 7.8% | 84.4% |
| Comparative Example 2 | 274 | 302 | 7.8% | 85.0% |
| Comparative Example 3 | 350 | 320 | 8.4% | 84.8% |

Dn10/Dv50 is the ratio of the diameter Dn10 corresponding to a cumulative number percentage being 10% in the number-basis distribution curve to the diameter Dv50 corresponding to a cumulative volume percentage being 50% in the volume basis distribution curve obtained by the laser scattering particle size analyzer. The larger the Dn10/Dv50 value is, the fewer small particles there are in the material.

As can be seen from the test results of Examples 4-6 and Comparative Examples 2 and 3, when the $I_2/I_1$ value meets $0<I_2/I_1 \leq 1$, the lithium ion battery prepared with an anode active material meeting $0.3 \leq Dn10/Dv50 \leq 0.6$ has a cycle performance, rate performance and swelling resistance that are all better than those of the lithium ion battery prepared with an anode active material meeting Dn10/Dv50<0.3 or 0.6<Dn10/Dv50.

3. Preparation of an Anode Active Material with an Oxide $MeO_y$ Layer on the Surface Thereof The anode active materials in Examples 7 to 15 were prepared as follows:

(1) The anode active material in Example 5, the carbon precursor and the oxide precursor $MeT_n$ were added to about 150 mL of ethanol and about 1.47 mL of deionized water, and stirred for about 4 hr until a uniform suspension was formed;

(2) The suspension was spray dried (inlet temperature: about 220° C., outlet temperature: about 110° C.) to obtain a powder; and (3) The powder was sintered at about 250-900° C. for about 0.5 to 24 hr, to obtain an anode active material with an oxide $MeO_y$ layer on the surface thereof.

Table 3-1 shows the process conditions for preparing the anode active materials in Examples 7 to 15.

TABLE 3-1

| No. | Anode active material in Example 5 | Carbon precursor | Oxide precursor $MeT_n$ | Sintering process |
|---|---|---|---|---|
| Example 7 | 100 g | Polyvinylpyrrolidone 2.21 g | 1 g aluminum isopropoxide | $N_2$ flow rate: 1.5 L/min, heating at 3° C./min to 600° C., holding for 2 hr |
| Example 8 | 100 g | Polyvinylpyrrolidone 2.21 g | 1 g isopropyl titanate | $N_2$ flow rate: 1.5 L/min, heating at 3° C./min to 600° C., holding for 2 hr |
| Example 9 | 100 g | Polyvinylpyrrolidone 2.21 g | 0.5 g isopropyl titanate + 0.5 g aluminum isopropoxide | $N_2$ flow rate: 1.5 L/min, heating at 3° C./min to 600° C., holding for 2 hr |
| Example 10 | 100 g | Polyvinylpyrrolidone 2.21 g | — | $N_2$ flow rate: 1.5 L/min, heating at 3° C./min to 600° C., holding for 2 hr |
| Example 11 | 100 g | Polyvinylpyrrolidone 2.21 g | 5 g aluminum isopropoxide | $N_2$ flow rate: 1.5 L/min, heating at 3° C./min to 600° C., holding for 2 hr |
| Example 12 | 100 g | Polyvinylpyrrolidone 2.21 g | 10 g aluminum isopropoxide | $N_2$ flow rate: 1.5 L/min, heating at 3° C./min to 600° C., holding for 2 hr |
| Example 13 | 100 g | — | 1 g aluminum isopropoxide | $N_2$ flow rate: 1.5 L/min, heating at 3° C./min to 600° C., holding for 2 hr |
| Example 14 | 100 g | Polyvinylpyrrolidone 3.31 g | 1 g aluminum isopropoxide | $N_2$ flow rate: 1.5 L/min, heating at 3° C./min to 600° C., holding for 2 hr |
| Example 15 | 100 g | Polyvinylpyrrolidone 6.31 g | 1 g aluminum isopropoxide | $N_2$ flow rate: 1.5 L/min, heating at 3° C./min to 600° C., holding for 2 hr |

"/" represents substance not present.

Table 3-2 and Table 3-3 show the performance test results of the anode active materials in Example 5 and Examples 7 to 15.

TABLE 3-2

| $I_2/I_1 = 0.64$ | Types of metal element | Metal content (wt %) | Carbon content in oxide MeO$_y$ layer (wt %) | Dv50 (μm) | Dn10/Dv50 | Specific surface area ($m^2 \cdot g^{-1}$) | Capacity per gram *($mAh \cdot g^{-1}$) | First efficiency |
|---|---|---|---|---|---|---|---|---|
| Example 5 | — | — | 0.030 | 5.0 | 0.5 | 1.42 | 1683 | 69.0% |
| Example 7 | Al | 0.125 | 0.334 | 5.1 | 0.51 | 1.45 | 1682 | 68.4% |
| Example 8 | Ti | 0.105 | 0.353 | 5.2 | 0.52 | 1.47 | 1678 | 74.0% |
| Example 9 | Al + Ti | 0.115 | 0.398 | 5.1 | 0.52 | 1.53 | 1682 | 70.3% |
| Example 10 | — | 0.000 | 0.364 | 5.2 | 0.51 | 1.38 | 1690 | 74.2% |
| Example 11 | Al | 0.521 | 0.350 | 5.3 | 0.52 | 1.98 | 1662 | 68.2% |
| Example 12 | Al | 1.124 | 0.387 | 5.4 | 0.53 | 2.40 | 1640 | 67.4% |
| Example 13 | Al | 0.115 | 0.000 | 5.1 | 0.52 | 1.43 | 1660 | 68.3% |
| Example 14 | Al | 0.124 | 0.546 | 5.2 | 0.52 | 2.01 | 1680 | 70.5% |
| Example 15 | Al | 0.122 | 1.098 | 5.1 | 0.52 | 2.42 | 1698 | 74.2% |

"/" represents substance not present.

TABLE 3-3

| No. | Number of cycles at 25° C. to 90% | Number of cycles at 45° C. to 80% | Swelling rate of battery after 400 cycles at 45° C. | Rate performance |
|---|---|---|---|---|
| Example 5 | 390 | 375 | 7.9% | 84.8% |
| Example 7 | 500 | 450 | 7.5% | 88.6% |
| Example 8 | 420 | 392 | 8.0% | 85.2% |
| Example 9 | 433 | 398 | 8.2% | 85.4% |
| Example 10 | 402 | 388 | 8.1% | 85.1% |
| Example 11 | 520 | 465 | 7.4% | 88.4% |
| Example 12 | 528 | 468 | 7.2% | 87.6% |
| Example 13 | 490 | 420 | 7.8% | 85.2% |
| Example 14 | 485 | 402 | 7.9% | 85.0% |
| Example 15 | 463 | 387 | 7.8% | 85.7% |

From the test results of Example 5 and Examples 7 to 15, it can be seen that coating the oxide MeO$_y$ layer on the anode active material that meets the conditions of $0 < I_2/I_1 \leq 1$ and $0.3 \leq Dn10/Dv50 \leq 0.6$ can further improve the cycle performance and rate performance of the lithium ion battery, while the first efficiency and battery swelling rate do not change significantly.

4. Preparation of an Anode Active Material with a Polymer Layer on the Surface Thereof The anode active materials in Examples 16 to 20, 23 and 24 were prepared as follows:

(1) The carbon material (single-wall carbon nanotube (SCNT) and/or multi-wall carbon nanotube (MCNT)) and a polymer were dispersed in water at high speed for about 12 hr to obtain a uniformly mixed slurry;

(2) The anode active material in Example 7 was added to the uniformly mixed slurry in (1) and stirred for about 4 hr to obtain a uniformly mixed dispersion liquid; and (3) The dispersion liquid was spray dried (inlet temperature: about 200° C., outlet temperature: about 110° C.) to obtain powder.

The preparation method of the anode active material in Examples 21 and 22 was similar to the above method, except that the solvent in the first step in Examples 21 and 22 was N-vinylpyrrolidone.

Table 4-1 shows the composition of the anode active materials in Examples 16-24.

TABLE 4-1

| No. | Carbon material | CNT content | Species of polymer | Polymer Content |
|---|---|---|---|---|
| Example 16 | SCNT | 1.0 wt. % | CMC-Na | 1.5 wt. % |
| Example 17 | MCNT | 1.0 wt. % | CMC-Na | 1.5 wt. % |
| Example 18 | SCNT:MCNT = 1:1 (weight ratio) | 1.0 wt. % | CMC-Na | 1.5 wt. % |
| Example 19 | SCNT | 0.1 wt. % | CMC-Na | 1.5 wt. % |
| Example 20 | SCNT | 5 wt. % | CMC-Na | 1.5 wt. % |
| Example 21 | SCNT | 1 wt. % | PVP | 1.5 wt. % |
| Example 22 | SCNT | 1 wt. % | PVDF | 1.5 wt. % |
| Example 23 | SCNT | 1 wt. % | PAANa | 1.5 wt. % |
| Example 24 | SCNT | 1 wt. % | CMC-Na | 4 wt. % |

"/" represents substance not present.

The full names of the English abbreviations in Table 3-1 are as follows:
SCNT: Single-wall carbon nanotube
MCNT: Multi-wall carbon nanotube
CMC-Na: Sodium carboxymethyl cellulose
PVP: Polyvinylpyrrolidone
PVDF: Polyvinylidene fluoride
PAANa: Sodium polyacrylate Table 4-2 shows the performance test results of the anode active materials in Examples 7 and 16 to 24.

TABLE 4-2

| No. | Number of cycles at 25° C. to 90% | Number of cycles at 45° C. to 80% | Swelling rate of battery after 400 cycles at 45° C. | Rate performance |
|---|---|---|---|---|
| Example 7 | 500 | 450 | 7.5% | 88.6% |
| Example 16 | 620 | 650 | 8.0% | 89.4% |
| Example 17 | 516 | 464 | 7.7% | 88.7% |
| Example 18 | 570 | 565 | 8.1% | 88.6% |
| Example 19 | 527 | 478 | 7.7% | 88.2% |
| Example 20 | 635 | 673 | 8.2% | 89.0% |
| Example 21 | 605 | 638 | 7.4% | 87.8% |
| Example 22 | 612 | 634 | 7.6% | 87.5% |
| Example 23 | 624 | 654 | 7.6% | 88.5% |
| Example 24 | 618 | 651 | 7.4% | 83.2% |

It can be seen from the test results of Example 7 and Examples 16 to 24 that coating a certain amount of the CNT-containing polymer layer on the anode active material in Example 7 can significantly improve the cycle performance and rate performance of lithium ion batteries.

Throughout the specification, references to "embodiment," "part of the embodiments," "one embodiment," "another example," "example," "specific example" or "part of the examples" mean that at least one embodiment or example of the present application includes specific features, structures, materials, or characteristics described in the embodiment or example. Thus, the descriptions appearing throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

We claim:

1. An anode material, comprising a silicon composite substrate, wherein in an X-ray diffraction pattern of the anode material, the highest intensity at 2θ within the range of 28.0° to 29.0° is $I_2$, and the highest intensity at 2θ within the range of 20.5° to 21.5° is $I_1$, wherein $0<I_2/I_1 \leq 1$, wherein the Dv50 of the silicon composite substrate is from 2.5 μm to 10 μm, and a particle size distribution of the silicon composite substrate meets: $0.3 \leq Dn10/Dv50 \leq 0.6$.

2. The anode material according to claim 1, wherein the silicon composite substrate comprises $SiO_x$, wherein $0.6 \leq x \leq 1.5$.

3. The anode material according to claim 1, wherein the silicon composite substrate comprises nano-Si crystalline grains, SiO, $SiO_2$, or any combination thereof.

4. The anode material according to claim 1, wherein the silicon composite substrate comprises nano-Si crystalline grains and the nano-Si crystalline grains have a size of less than 100 nm.

5. The anode material according to claim 1, further comprising an oxide $MeO_y$ layer, wherein the oxide $MeO_y$ layer is coated on at least a portion of the silicon composite substrate, wherein Me comprises at least one of Al, Si, Ti, Mn, V, Cr, Co or Zr, and y is 0.5 to 3; wherein the oxide $MeO_y$ layer comprises a carbon material.

6. The anode material according to claim 5, wherein a thickness of the oxide $MeO_y$ layer is 0.5 nm to 100 nm.

7. The anode material according to claim 5, wherein based on the total weight of the anode material, a weight percentage of the Me element is 0.005 wt % to 1 wt %.

8. The anode material according to claim 5, wherein a weight percentage of the carbon material of the oxide $MeO_y$ layer is 0.01 wt % to 1 wt % based on the total weight of the anode material.

9. The anode material according to claim 5, further comprising a polymer layer, wherein the polymer layer is coated on at least a portion of the oxide $MeO_y$ layer, wherein the polymer layer comprises a carbon material.

10. The anode material according to claim 9, wherein the polymer layer comprises polyvinylidene fluoride and its derivatives, carboxymethyl cellulose and its derivatives, sodium carboxymethyl cellulose and its derivatives, polyvinylpyrrolidone and its derivatives, polyacrylic acid and its derivatives, polystyrene-butadiene rubber, polyacrylamide, polyimide, polyamideimide or any combination thereof.

11. The anode material according to claim 5, wherein the carbon material comprises carbon nanotubes, carbon nanoparticles, carbon fibers, graphene, or any combination thereof.

12. The anode material according to claim 9, wherein based on the total weight of the anode material, a weight percentage of the polymer layer is 0.05 wt % to 5 wt %.

13. The anode material according to claim 9, wherein a thickness of the polymer layer is 1 nm to 500 nm.

14. The anode material according to claim 1, wherein the anode material has a specific surface area of about 10 to 30 $m^2/g$.

15. A method for preparing the anode material according to claim 1, comprising:
    mixing silicon dioxide and a metal silicon powder at a molar ratio of 1:5 to 5:1 to obtain a mixed material;
    heating the mixed material at a temperature range of 1100 to 1550° C. under $10^{-4}$ to $10^{-1}$ kPa for 0.5 to 24 hr to obtain a gas;
    condensing the obtained gas to obtain a solid;
    crushing and screening the solid; and
    heat-treating the solid at a temperature range from 400° C. to 1200° C. for 1 to 24 hr, and cooling the heat-treated solid to obtain an anode active material.

16. An anode, comprising an anode material, the anode material comprises a silicon composite substrate, wherein in an X-ray diffraction pattern of the anode material, the highest intensity at 2θ within the range of 28.0° to 29.0° is $I_2$, and the highest intensity at 2θ within the range of 20.5° to 21.5° is $I_1$, wherein $0<I_2/I_1 \leq 1$, wherein the Dv50 of the silicon composite substrate is from 2.5 μm to 10 μm, and a particle size distribution of the silicon composite substrate meets: $0.3 \leq Dn10/Dv50 \leq 0.6$.

17. An electrochemical device, comprising the anode according to claim 16.

18. An electronic device, comprising the electrochemical device according to claim 17.

* * * * *